United States Patent
Brems et al.

(10) Patent No.: US 11,588,688 B2
(45) Date of Patent: *Feb. 21, 2023

(54) DEVICE CONNECTOR SERVICE FOR DEVICE AND MANAGEMENT SERVICE INTEGRATION

(71) Applicant: VMware, Inc., Palo Alto, CA (US)

(72) Inventors: Karen J. Brems, Redwood, CA (US); Pedha Venka Reddy Gade, Atlanta, GA (US); Jong Ho Won, Palo Alto, CA (US); Qiuxi Zhu, Palo Alto, CA (US); Nandakishore Mallapragada, Palo Alto, CA (US); Daniel E. Zeck, Roswell, GA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,474

(22) Filed: Oct. 25, 2021

(65) Prior Publication Data

US 2022/0353139 A1 Nov. 3, 2022

Related U.S. Application Data

(63) Continuation of application No. 17/244,093, filed on Apr. 29, 2021, now Pat. No. 11,184,231.

(51) Int. Cl.
*G06F 15/177* (2006.01)
*H04L 41/0813* (2022.01)
*H04L 67/02* (2022.01)

(52) U.S. Cl.
CPC .......... *H04L 41/0813* (2013.01); *H04L 67/02* (2013.01)

(58) Field of Classification Search
CPC ............................ H04L 41/0813; H04L 67/02
USPC ........................................ 709/220, 221, 222
See application file for complete search history.

(56) References Cited

U.S. PATENT DOCUMENTS

| | | | | |
|---|---|---|---|---|
| 7,523,139 | B1* | 4/2009 | Kemkar | G06F 3/0667 |
| 9,538,311 | B2* | 1/2017 | Baum | H04L 63/0807 |
| 2005/0223228 | A1* | 10/2005 | Ogawa | G06Q 20/382 |
| | | | | 713/168 |
| 2012/0314090 | A1* | 12/2012 | Jallow | H04L 63/18 |
| | | | | 345/619 |
| 2015/0026330 | A1* | 1/2015 | Ahmed | G06F 21/73 |
| | | | | 709/224 |
| 2015/0222621 | A1* | 8/2015 | Baum | H04L 63/0807 |
| | | | | 726/9 |

* cited by examiner

*Primary Examiner* — Liang Che A Wang
(74) *Attorney, Agent, or Firm* — Thomas Horstemeyer, LLP

(57) ABSTRACT

Disclosed are various examples of device and management service integration using a device connector service that acts as a proxy. The device connector service can receive a device communication that is relayed by a device connector client executed on an edge device. The device communication includes device connector authentication data, and a device identifier for a device. The device communication is modified into a modified device communication that includes management service authentication data, and a management unique device identifier (UDID) that is different from the device identifier. The device connector service transmits the modified device communication to a management service.

20 Claims, 5 Drawing Sheets

DEVICE CONNECTOR SERVICE FOR DEVICE AND MANAGEMENT SERVICE INTEGRATION

CROSS-REFERENCE TO RELATED APPLICATIONS

The present application claims priority to and the benefit of U.S. Provisional application Ser. No. 17/244,093, filed on Apr. 29, 2021 and entitled "DEVICE CONNECTOR SERVICE FOR DEVICE AND MANAGEMENT SERVICE INTEGRATION," which is hereby incorporated herein by reference in its entirety.

BACKGROUND

An endpoint management service can manage a variety of types of devices and endpoints, including devices, Internet-of-Things (IoT) devices, and other types of devices. However, as endpoint management expands to include more types of devices, the process of connecting devices to the management service can be difficult and time consuming. Some devices are associated with a particular user who can install management software to the device or otherwise assist administrators in initiating management integration. However, other devices can be headless, such as IoT sensor devices. Further devices can be user agnostic such as devices that are utilized on premises to connect to network services or virtualized devices.

Integrating existing and newly deployed devices can be a difficult and inefficient task for administrators. Where devices are associated with a user, the management integration process can consume productivity time for the user as well. As a result, there is an increasing need for a more efficient and extensible solution for integration of devices with a management service.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to device and management service integration using a device connector service. An endpoint management service can manage a variety of types of devices and endpoints, Internet-of-Things (IoT) devices, and other types of devices. However, as endpoint management expands to include more types of devices and endpoints, the process of connecting devices to the management service can be difficult and time consuming. Some devices are associated with a particular user who can install management software to the device or otherwise assist administrators in initiating management integration. However, other devices can be headless, such as IoT sensor devices. Further, devices can be user agnostic such as devices that are utilized on premises to connect to network services or virtualized devices. Even where devices are associated with a user, the management integration process can consume productivity time for the user. As a result, there is an increasing need for a more efficient and extensible solution for integration of devices with a management service.

The present disclosure provides mechanisms that enable device and management service integration using a headless device connector service. That is, the device connector service can include a service that operates without a direct user interface. Management can be performed using an endpoint management service, while the device connector service enables administrators to enroll and subsequently manage devices, IoT devices, and thin client devices. In some cases, thin client devices and other devices can be user agnostic, and can provide access to virtual devices over a network. The devices, IoT devices, and thin client devices can include headless and automated devices, and devices that can operate in an automated or headless mode.

Figure 1:
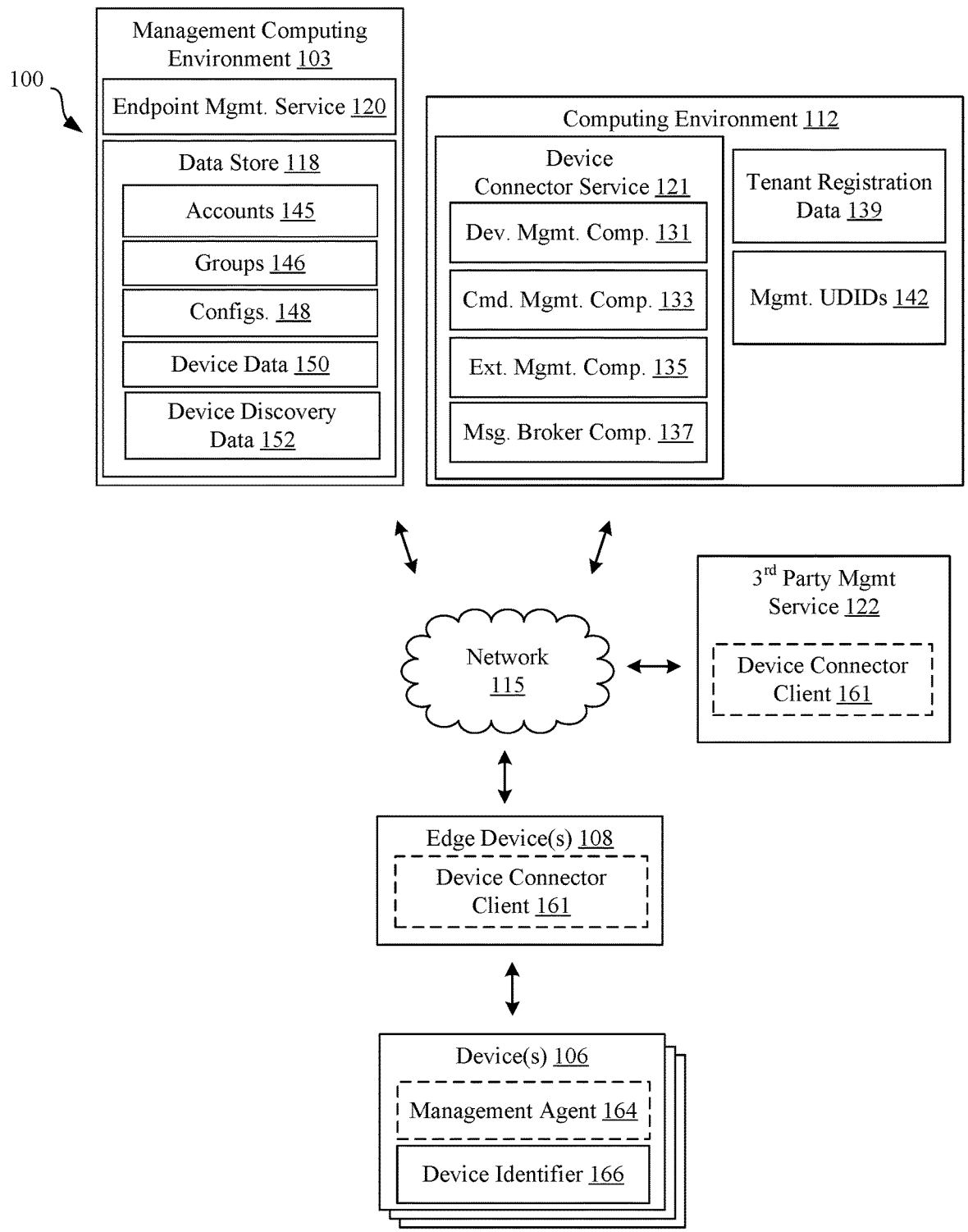
FIG. 1 is a drawing of a networked environment including components that provide device and management service integration, according to the present disclosure.

With reference to FIG. 1, shown is an example of a networked environment 100. The networked environment 100 can include one or more management computing environment 103, one or more devices 106, one or more edge devices 108, a computing environment 112, and a third-party management service 122 in communication with one another over a network 115.

The network 115 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 115 can also include a combination of two or more networks 115. Examples of networks 115 can include the Internet, intranets, extranets, virtual private networks (VPNs), and similar networks.

The management computing environment 103 can include, for example, a server computer, or any other system providing computing capability. Alternatively, the management computing environment 103 can include a plurality of computing devices that are arranged, for example, in one or more server banks, computer banks, or other arrangements. The management computing environments 103 can include a grid computing resource or any other distributed computing arrangement. The computing devices can be located in a single installation or can be distributed among many different geographical locations.

The management computing environments 103 can also include or be operated as one or more virtualized computer instances. For purposes of convenience, the management computing environment 103 is referred to herein in the singular. Even though the management computing environment 103 is referred to in the singular, it is understood that a plurality of management computing environments 103 can be employed in the various arrangements as described above. As the management computing environment 103 communicates with the device 106 remotely over the network 115, the management computing environment 103 can be described as a remote management computing environment 103.

Various applications can be executed in the management computing environment 103. For example, each management computing environment 103 can include an endpoint management service 120 that includes a management console, as well as other applications that may be executed in the management computing environment 103. Various data is stored in one or more data store 118 that is accessible to the management computing environment 103. The data store 118 may be representative of a plurality of data stores 118, which can include relational databases, object-oriented databases, hierarchical databases, hash tables or similar key-value data stores, as well as other data storage applications or data structures. The data stored in the data store 118 is associated with the operation of the various applications or functional entities described below. This data can include one or more device records, compliance rules for devices, accounts 145, groups 146, configurations 148, device data 150, device discovery data 152, as well as potentially other data.

The accounts 145 can include user accounts, device accounts, virtual device accounts, and other accounts with the endpoint management service 120. The groups 146 can include user groups, device groups, and other groups of accounts 145. The configurations 148 can include settings, commands, actions, and other device-specific configurations for devices 106. For example, if a device 106 is an Internet-of-Things device 106 such as a sensor device 106, a configuration 148 can include a command or configuration to provide a particular detected parameter or state of the device 106 periodically, on demand, and on a schedule. The device data 150 can include parameters and other states collected from the device 106.

The groups 146 can refer to a group of accounts 145 with the endpoint management service 120. User and device groups can be created by an administrator of the management service such that a batch of devices 106, or a set of users logging in to use a device 106 for enterprise purposes, can be configured according to common settings. For instance, an enterprise can create a group 146 for the marketing department and the sales department, where devices 106 in the marketing department are configured differently from the devices 106 in the sales department.

The device 106 can be representative of one or more devices that may be connected to the network 115. Examples of devices 106 include processor-based systems, such as desktop computers, laptop computers, a personal digital assistant, a cellular telephone, a smartphone, a tablet computer system, smart speakers or similar headless devices, or any other device with like capability. The device 106 can also be equipped with networking capability or networking interfaces, including a localized networking or communication capability, such as a near-field communication (NFC) capability, radio-frequency identification (RFID), Bluetooth, Wired Bacnet, Thread, Zigbee, read write capability, and other localized networking and communication capability.

The device 106 can include an operating system. The operating system can be configured to execute various client applications. Examples of operating systems include MICROSOFT WINDOWS®, APPLE macOS®, APPLE iOS GOOGLE ANDROID®, and various distributions of Linux. The client applications can include web browsers, enterprise applications, social networking applications, word processors, spreadsheet applications, and media viewing applications.

The edge device 108 can include a gateway device or other devices capable of receiving and responding to communications from the device 106, as well as providing instructions to the device 106. The edge device 108 can be a third-party device with respect to the endpoint management service 120 and the device connector service 121, such as a device operated by the third-party management service 122. Alternatively, the edge device 108 can include devices operated by an enterprise corresponding to a tenant of the endpoint management service 120, or devices operated by the endpoint management service 120 itself. In some examples, the third-party management service 122 can route communications with a device 106 through an edge device 108. The edge device 108 can also execute a device connector client 161 that operates as a client of the device connector service 121.

The computing environment 112 can include, for example, a server computer, or any other system providing computing capability. Alternatively, the computing environment 112 can include a plurality of computing devices that are arranged, for example, in one or more server banks, computer banks, or other arrangements. The computing environment 112 can include a grid computing resource or any other distributed computing arrangement. The computing devices can be located in a single installation or can be distributed among many different geographical locations. The computing environment 112 can be operated by a third-party service with respect to the management computing environments 103; alternatively, the computing environment 112 can be affiliated with and part of one or more management computing environments 103.

The computing environment 112 can execute one or more applications including a device connector service 121. The computing environment 112 can also include one or more data stores storing data that includes a device connector service 121, tenant registration data 139, management Unique Device Identifiers (UDIDs) 142. The computing environment 112 can also store tokens, certificates, credentials, and other authentication data for authentication with the edge devices 108, third-party management services 122, and endpoint management service 120.

The endpoint management service 120 can provide endpoint management for multiple tenants, which can refer to enterprises or enterprises that employ the endpoint management service 120. The endpoint management service 120 can be executed to oversee the operation of devices 106, virtual devices, and other endpoints. The endpoint management service 120 can be referred to as a unified endpoint management (UEM) service. Managed devices 106 can be enrolled with the endpoint management service 120. Virtual devices can include virtual machines and other virtual components that provide desktop, application, or desktop and application services that are accessed by the devices 106. In some examples, an enterprise, such as a company, enterprise, or other entity, can operate the endpoint management service 120 to oversee or manage the operation of the devices 106 of its employees, contractors, customers, or other users having accounts 145 with the enterprise. The endpoint management service 120 can further cause device records, groups 146, and accounts 145 to be created, modified, or removed from the data store 118. Each tenant can include a logically separate group of accounts 145, groups 146, configurations 148, device data 150, device discovery data 152, and compliance rules. As a result, this information can be tenant-specific with respect to a tenant and an identifier of the tenant such as a tenant account, a tenant email domain or address, and other information.

The device discovery data 152 can include information to provide to a device 106 that is in a discovery process, such as an auto-discovery process or otherwise initially connecting to a particular network 115. The device discovery data 152 can include a tenant email domain, an enterprise or tenant identifier, and a Uniform Resource Locator (URL) or another endpoint identifier for a device connector client 161, or a device 106 executing the device connector client 161. The enterprise or tenant identifier can include a subtenant or sub-group 146 of the enterprise tenant as whole. The tenant identifier can be utilized for devices 106 to be integrated with the endpoint management service 120, using the device connector service 121. For example, the subtenant group 146 can include a headless-device-specific group 146 that includes only headless devices and devices operating in a headless mode, a thin client device group, a user agnostic device group, an IoT device group, a UEM agentless device group, or another device-category-specific group 146. An identifier for a group 146 can be considered an enterprise or enterprise identifier corresponding to a subgroup of a root enterprise identifier that identifies the enterprise or tenant as a whole.

The device connector service 121 can include a cloud- or regionally-hosted service that operates in conjunction with a device connector client 161 that can be executed using a gateway, another edge device, or a third-party management service 122. The device connector service 121 can include a headless service that exposes application programming interfaces (APIs) for communications with the endpoint management service 120, and also for communications with one or more device connector client 161 that in turn maintains communications with one or more devices 106. The device connector service 121 can enable enrollment and subsequent commands and management of devices 106. While any device 106 can be managed in this architecture, this is particularly useful for agentless devices 106 that do not include a management agent 164 associated with the endpoint management service 120. A management agent 164 can in some cases enable direct communications, such as device 106 check-ins directly with the endpoint management service 120.

The device connector service 121 can include a device management component 131, a command management component 133, an extension management component 135, and a message broker component 137, among other instructions and executable components. The device connector service 121 can access tenant registration data 139 and can generate and store management unique device identifiers (UDIDs) 142.

The message broker component 137 can include a Message Queuing Telemetry Transport (MQTT) broker, Rabbit Message Queuing (RabbitMQ) broker, Extensible Messaging and Presence Protocol (XMPP) component, Google Cloud Messaging component, Kafka component, or another message queuing component that can provide and enable a publish-subscribe mechanism.

A management UDID 142 can be a globally unique device identifier for a device 106 for management by the endpoint management service 120. The management UDID 142 can be different from the device identifier 166. For example, the device identifier 166 can be a manufacturer-assigned or enterprise-assigned device identifier, such as a serial number for the device 106. By contrast, the management UDID 142 can be generated by the device connector service 121 or a component of the device connector service 121.

The device connector service 121 can include a UDID generation algorithm that generates the management UDID 142 for a device 106. The UDID generation algorithm can include a hash function or another type of algorithm. The UDID generation algorithm can take the device identifier 166, and one or more additional values as inputs, such as a tenant identifier and a client identifier. The tenant identifier can include a tenant email domain or another identifier of the tenant or enterprise. The client identifier can include an identifier of a third-party management service 122, an identifier of an edge device 108, or an identifier of the instance of the device connector client 161 service that is communicating with the device 106. The third-party management service 122 can include a legacy or additional management service operated separately from the endpoint management service 120, each of which can be employed by the tenant to manage the device 106. The third-party management service 122 can have managed devices 106 for multiple tenants.

The device management component 131 can include a number of APIs, for example: a connector enroll API, a connector sample API, and a connector beacon or connector check-in API. In some examples, each of these APIs can operate for a single device 106 and in other cases, each of these APIs can support bulk or multi-device operations. In general, these APIs can abstract out the complexity of comparable UEM or endpoint management service APIs. For example, the connector enroll API can operate in place of four different endpoint management service APIs.

The connector enroll API can take the following parameters: tenant email domain, enterprise group identifier, client identifier, and device identifier 166. The tenant email domain can be used to identify the tenant-specific UEM service instance of the endpoint management service 120 that the device 106 should be enrolled into and identifies the tenant or enterprise to which the device 106 belongs. The enterprise group identifier can identify the enterprise group 146 or subgroup that the device 106 gets enrolled into. The client identifier can include a tenant identifier of the tenant, an identifier of a third-party management service 122, or an identifier of the instance of the device connector client 161 service that is communicating with the device 106.

The device identifier 166 can be a manufacturer-assigned or enterprise-assigned device identifier, such as a serial number for the device 106. In order to guarantee uniqueness across all tenants and all device connector clients 161 (and/or third-party management services 122), the device connector service 121 can hash the device identifier 166 with the tenant email domain and the client identifier when the connector enroll API is called.

This management UDID 142 can then be associated with the device 106 and its device identifier 166 and can be provided back to the device connector client 161 that capped the connector enroll API. The device connector client 161 can then use the management UDID 142 in subsequent connector service API calls to the device connector service 121 for the device 106, such as providing samples or device data 150 using the connector sample API, or relaying a device check-in beacon using the connector beacon API.

As part of the connector enroll API functionality, the device connector service 121 can query the endpoint management service 120 for an enrollment user associated with the enterprise group identifier provided through the connector enroll API. If there is more than one, the device connector service 121 can pick the first one identified. Using a user identifier for the enrollment user, the device connector service 121 can register the device 106 or request enrollment data from the endpoint management service 120, providing the management UDID 142.

The endpoint management service 120 can return an enrollment token and other enrollment data. The device connector service 121 can enroll the device 106 with the endpoint management service 120 and receive a token such as an HMAC token for that device 106, which can be stored and used to authenticate subsequent endpoint management service API calls for that device 106. The endpoint management service 120 can create an account 145 for the device 106 based on the management UDID 142. The management UDID 142 is then returned to the device connector client 161. The edge device 108 or third-party management service 122 that executes the device connector client 161 can store this value for subsequent device connector service API calls.

The device connector service 121 can maintain a database or data structure within a data store that contains all of the management UDIDs 142 that it integrates or manages, along with their HMAC token, tenant email domain (used as an enterprise tenant identifier), and the client identifier of the device connector client 161 service or third-party management service 122 that is managing that device 106. This maintains the relationship of devices 106 that are managed or integrated "by proxy" using the device connector service 121.

From the perspective of the endpoint management service 120, management of an agentless device 106 that is integrated using the device connector service 121 can be similar to other managed devices 106 that include a management agent 164. This means operations like adding to a device command to a command queue can be performed without modification. The device connector service 121 can act as a proxy that enables agentless devices 106 to implement commands from a command queue that is typically accessed and implemented using a management agent 164.

The command management component 133 can poll a component of the endpoint management service 120 to be notified of any pending commands for any devices 106 it manages. The command management component 133 can notify the device connector client 161 that is associated with that device 106 and its management UDID 142. The command management component 133 can include the management UDID 142 in the notification to the device connector client 161. This notification process can include publishing to the message broker component 137 such as an MQTT broker.

The device connector client 161 can have a messaging subscription with the message broker component 137 to pick up the notifications. The notification can function as a "shoulder tap" or "dinner bell" of pending work, which contains only the management UDID 142 in the message. The device connector client 161 can query the device connector service 121 for the actual command payload. For example, the device connector client 161 can invoke the connector beacon or connector check-in API of the device connector service 121.

The device connector service 121 does not store or buffer the commands or maintain the device command queue itself. Rather, the device connector service 121 relays the command retrieval request to the endpoint management service 120 at that time or on demand. The command queue is maintained by the endpoint management service 120, as for any other device type, such as those that include a management agent 164. The endpoint management service 120 can provide the commands in the device 106 command queue to the device connector client 161, which relays the commands back to the device 106. In other examples, the endpoint management service 120 can return the commands to the device connector service 121, which can transmit the commands to the device connector client 161, which provides the commands to the device 106.

In some implementations, the device connector service 121 can sequentially poll the endpoint management service 120 for each device 106 in its list of integrated devices 106. The device list can be divided according to a group 146 and a polling thread can be spawned for each group 146. However, in other cases the device connector service 121 and the endpoint management service 120 can include a pub/sub mechanism or a batch request mechanism to provide indications of pending commands.

The extension management component 135 can register and manage the third-party management services 122, edge devices 108, and other partner or third-party extensions that can execute or operate as a device connector client 161. In other words, each device connector client 161 can be registered along with a client identifier as discussed.

In order to use endpoint management APIs, the extension management component 135 of the device connector service 121 can be configured to authenticate each tenant that is associated with a device 106 that it integrates. The extension management component 135 can accomplish this using a token service. The device connector service 121 can receive or otherwise be provisioned with a tenant identifier and tenant secret for each endpoint management service 120 tenant. The extension management component 135 can provide a connector tenant registration API.

A console user interface of the endpoint management service 120 can include an 'enable device connector service' user interface element that invokes the connector tenant registration API and provides tenant registration data 139 as parameters for the logged-in tenant. The tenant registration data 139 can include a tenant identifier or root enterprise identifier of the tenant with the endpoint management service 120. The tenant registration data 139 can include a tenant identifier, a tenant secret, administrator credentials or API credentials, an API token for API communications, and a URL of the endpoint management service 120 for API and other communications. Once the device connector service 121 has the tenant identifier and tenant secret, tokens can be generated by a token service of the endpoint management service 120 or a third-party token service. The token can be refreshed for tenant authentication.

There can be multiple layers of authentication for device and management service integration using a device connector service 121. One layer can include service to service authentication between the services, including the endpoint management service 120, the device connector service 121, and the device connector client 161 services on third-party devices or cloud services. Service to service authentication can be accomplished using certificate mutual authentication where the services exchange signed certificates to authenticate each other. Tenant authentication can be accomplished using token service tokens. Device 106 to endpoint management service 120 authentication can use hash-function-based message authentication code (HMAC) tokens. Since an agentless device 106 does not communicate directly with the endpoint management service 120, the device connector service 121 can include a mechanism that receives a management HMAC token from the endpoint management service 120 when it enrolls the device 106. The device connector service 121 can also retrieve the HMAC token based on management UDID 142 to authenticate with the endpoint management service 120 for relayed check-ins, relayed device data 150, and other device-specific communications.

Generally, the agentless device 106 can initially communicate with the device connector client 161, which forwards communications to the device connector service 121, which in turn communicates with the endpoint management service 120. This process is further described with respect to FIGS. 2 and 3.

Figure 2:
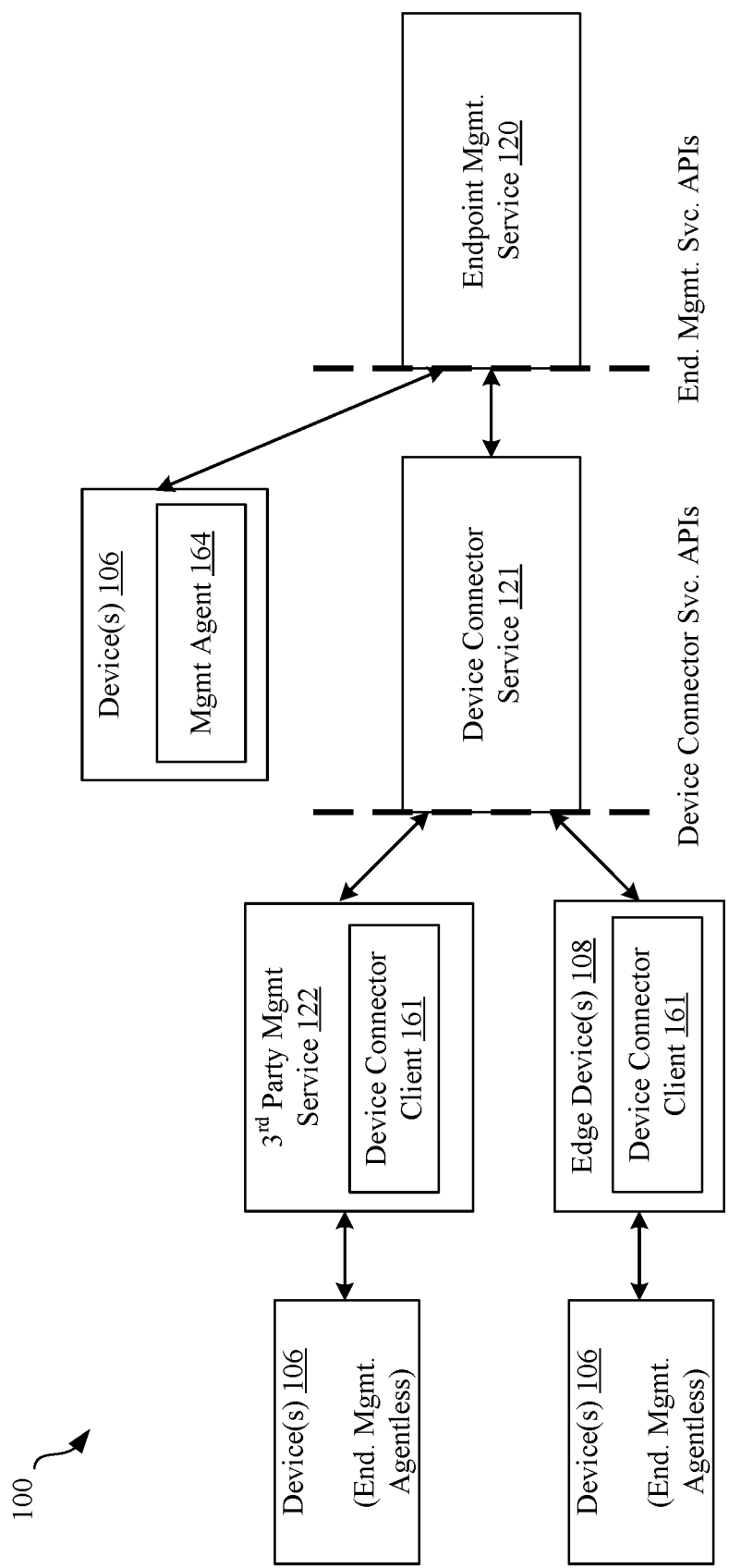
FIG. 2 is a drawing depicting an example of functionalities performed by components of the network environment for device and management service integration, according to the present disclosure.

FIG. 2 shows an example of functionalities performed by components of the network environment 100 for integration of devices 106 to the endpoint management service 120 using a device connector service 121. The figure provides an example architecture for integration of devices 106 to the endpoint management service 120. The components to the left can be considered clients of the components to the right. The figure shows the communication paths for various devices 106 to communicate with the endpoint management service 120.

While data flow can be performed left-to-right, the reverse flow can be achieved using a push notification for pending commands. For example, using a push notification from the endpoint management service 120 to the device connector service 121; and then using a push notification from the device connector service 121 to the device connector client 161, which can relay data to the device 106.

The third-party management services 122 can be services developed and deployed by third parties such as hardware vendors. The third-party management services 122 can provide multi-tenant SaaS services that manage fleets of individual devices 106. Third-party management services 122 can include or integrate with a device connector client 161 that enables communication and integration with the device connector service 121. The device connector client 161 or another version of the device connector client 161 can be installed on gateways and other edge devices 108. The device connector client 161 can communicate with connected devices 106 using an appropriate protocol such as REST APIs and others. In further cases, the device connector client 161 can be installed on a device 106 directly, even if the device 106 does not or cannot execute a management agent 164 of the endpoint management service 120. The device connector client 161 can also include an implementation of an API specification utilized by or published by the device connector service 121 or the endpoint management service 120 for communications with the devices 106.

Figure 3:
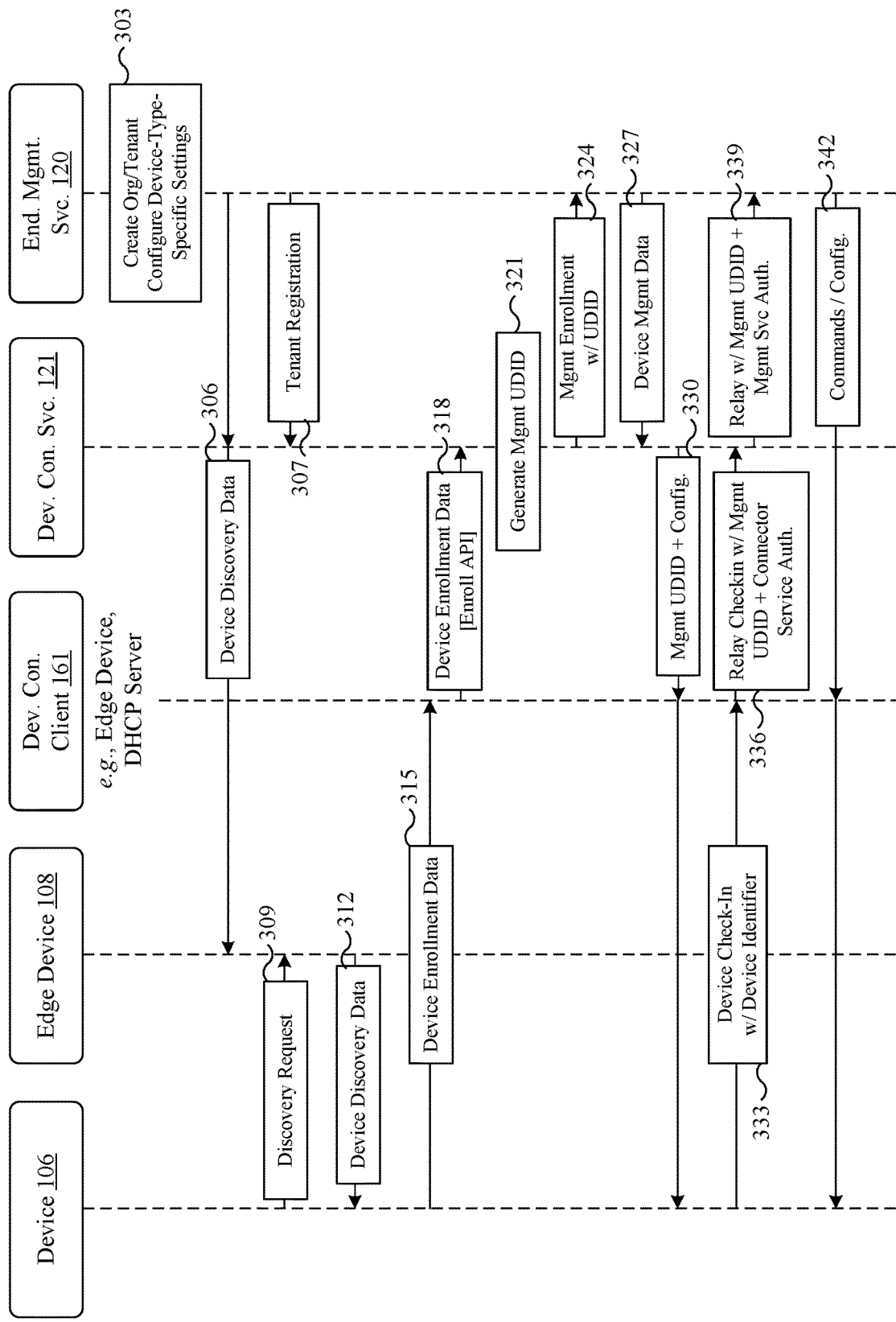
FIG. 3 is a sequence diagram depicting an example of functionalities performed by components of the network environment for device and management service integration, according to the present disclosure.

FIG. 3 is a sequence diagram that shows an example of functionalities performed by components of the network environment 100 for integration of devices 106 to the endpoint management service 120 using a device connector service 121.

In step 303, the endpoint management service 120 can generate a user interface through which an administrator can create device-type-specific and device-specific configurations 148 for an enterprise tenant of the endpoint management service 120. The administrator can provide a list of devices 106 for a particular configuration 148, or the devices 106 can be assigned upon enrollment based on device type identified at enrollment time.

Device type can be provided in communications from the device 106 to the device connector client 161, to the device connector service 121, and to the endpoint management service 120. The device type can also be identified by the device connector service 121 based on the device identifier 166, and can be provided to the endpoint management service 120 as a parameter during enrollment. This can enable the endpoint management service 120 to identify appropriate configurations 148 and commands for the device 106.

In step 306, the endpoint management service 120 can transmit device discovery data 152. The device discovery data 152 can include information to provide to a device 106 that is in a discovery process such as an auto-discovery process or otherwise initially connecting to a particular network 115. The device discovery data 152 can include a tenant email domain, a group 146, and a URL or another endpoint identifier for a device connector client 161 or a device executing the device connector client 161. In some cases, the endpoint management service 120 can transmit this directly to a DHCP server or another edge device 108 that the device 106 can communicate with on initial network connection. Alternatively, the endpoint management service 120 can transmit the device discovery data 152 to the device connector service 121, which can provide this information to the DHCP server or edge device 108.

In step 307, the endpoint management service 120 can transmit tenant registration data 139 to the device connector service 121. The endpoint management service 120 can invoke the connector tenant registration API of the device connector service 121 and can provide tenant registration data 139 as parameters for a particular tenant. The tenant registration data 139 can include a tenant identifier or root enterprise identifier of the tenant with the endpoint management service 120. The tenant registration data 139 can include a tenant identifier, a tenant secret, administrator credentials or API credentials, an API token for API communications, and a URL of the endpoint management service 120 for API and other communications.

In step 309, the device 106 can connect to a network 115, for example, as part of an auto-discovery process. This can include communicating with a DHCP server or another edge device 108. In step 312, the device 106 can receive device discovery data 152 from the DHCP server, including a tenant email domain, a tenant group 146 identifier, and the URL for the device connector client 161.

In step 315, the device 106 can transmit device enrollment data or device registration data to the endpoint or URL of the device connector client 161 that is identified in the device discovery data 152. The device enrollment data can include the tenant email domain, and the tenant group 146 identifier from the device discovery data 152. The device enrollment data can also include a device identifier 166 of the device 106, such as its serial number. The device connector client 161 can be executed on the edge device 108 or DHCP provider. In other cases, the device connector client 161 can be executed on another edge device 108, or on a third-party management service 122.

In step 318, the device connector client 161 can relay and transmit device enrollment data to the device connector service 121. For example, the device connector client 161 can invoke a connector enroll API of the device connector service 121. The connector enroll API can take the following parameters: tenant email domain, enterprise group 146 identifier, client identifier, and device identifier 166. The tenant email domain can be used to identify the tenant-specific UEM service instance of the endpoint management service 120 that the device 106 should be enrolled into and identifies the tenant or enterprise to which the device 106 belongs. The enterprise group identifier can identify the enterprise group 146 or subgroup that the device 106 gets enrolled into. The client identifier can include a tenant identifier of the tenant, an identifier of a third-party management service 122, or an identifier of the instance of the device connector client 161 service that is communicating with the device 106.

In step 321, the device connector service 121 can generate a management UDID 142 for enrollment of the device 106 with the endpoint management service 120. The management UDID 142 can be generated by the device connector service 121 or a component of the device connector service 121. The device connector service 121 can include a UDID generation algorithm that generates the management UDID 142 for a device 106. The UDID generation algorithm can take the device identifier 166, and one or more additional values as inputs, such as a tenant identifier and a client identifier. The tenant identifier can include a tenant email domain or another identifier of the tenant or enterprise. The client identifier can include an identifier of a third-party management service 122, an identifier of an edge device 108, or an identifier of the instance of the device connector client 161 service that is communicating with the device 106.

In step 324, the device connector service 121 can perform an enrollment of the device 106 with the endpoint management service 120. This can include transmitting multiple requests, such as invoking multiple APIs of the endpoint management service 120 using parameters and information received through the connector enrollment API, and authenticated using the parameters and information received through the connector tenant registration API.

In some examples, the enrollment process can include querying the endpoint management service 120 for a user identifier based on the group 146 identifier. The device connector service 121 can invoke a user identifier lookup API or another function of the endpoint management service 120 using the group 146 identifier as a parameter. In some cases, multiple user identifiers can exist, and the first one in a list of the multiple user identifiers can be used. The user identifier can include a unique user identifier (UUID) of the endpoint management service 120. The UUID can be associated with a particular account 145. The account 145 can be a group-specific account such as an agentless device account 145 for an agentless devices group 146, or a thin client devices account 145 for a thin client devices group 146, and so on. The account 145 can be associated with one or more user, such as an administrator for agentless devices or thin client devices.

The enrollment process can include transmitting a request for an enrollment token from the endpoint management service 120. The device connector service 121 can invoke an enrollment token API or another function of the endpoint management service 120 using the UUID and the management UDID 142 as parameters to obtain the enrollment token. The device connector service 121 can also invoke an enrollment session API or another function of the endpoint management service 120 using the management UDID 142 and the enrollment token as parameters to obtain a session identifier. The device connector service 121 can also invoke a device enrollment API or otherwise transmit an enrollment request to the endpoint management service 120 using the management UDID 142 and the session identifier as parameters.

In step 327, the device connector service 121 can receive management data from the endpoint management service 120. For example, the device connector service 121 can receive an initial device configuration 148 or enrollment-specific device configuration 148 in response to the enrollment request or otherwise based on an enrollment process to enroll the device 106 with the endpoint management service 120. The management data can also include a management token for the device 106, such as an HMAC token. The device connector service 121 can extract the management token and store it in a data store of the computing environment 112.

In step 330, the device connector service 121 can transmit the management UDID 142 and the device configuration 148 to the device connector client 161. The device connector client 161 can store the management token in the edge device 108 or a data store of the third-party management service 122. The device connector client 161 can transmit the device configuration 148 to the device 106. For example, the device connector client 161 can invoke a function of the device 106 to apply the device configuration 148 to the device 106.

The device 106 is now enrolled with the endpoint management service 120 and configured according to a device-specific or device-type-specific configuration 148 from the endpoint management service 120. Steps 333-342 describe a check-in or beacon process from the enrolled device 106 to the endpoint management service 120, as integrated or connected using the device connector client 161. While the process describes a check-in or beacon process, the transmission of a device data 150 sample from the device 106 to the endpoint management service 120 is facilitated in a similar process.

In step 333, the device 106 can transmit a check-in or beacon to the device connector client 161. The check-in or beacon can include the device identifier 166. Since the endpoint management service 120 uses a globally unique management UDID 142 for management of the device 106, the device identifier 166 can be mapped to the management UDID 142 by the device connector client 161 or the device connector service 121.

In step 336, the device connector client 161 can relay the check-in or beacon to the device connector service 121. Since the device connector service 121 has provided the management UDID 142 to the device connector client 161 in step 330, in this example the device connector client 161 can maintain a data structure that can be used to map device identifiers 166 to management UDIDs 142. In other examples, the device connector client 161 can forward the check-in or beacon to the device connector service 121 without modification, and the device connector service 121 can maintain the data structure that can be used to map device identifiers 166 to the management UDIDs 142.

The device connector client 161 can authenticate the check-in using a certificate and other connector service authentication credentials. For example, certificate mutual authentication can be used between the device connector client 161 and the device connector service 121 to authenticate the check-in. The device connector client 161 can store a connector API token of the device connector service 121 and can use the connector API token to authenticate the device connector service check-in. The device connector service check-in can include the management UDID 142 (or the device identifier 166), and the connector API token.

In step 339, the device connector service 121 can in turn, relay the check-in or beacon to the endpoint management service 120. The device connector client 161 can include management service authentication credentials. The device connector service 121 can authenticate the check-in using a certificate and other management service authentication credentials. For example, a certificate mutual authentication can be used between the device connector service 121 and the endpoint management service 120 to authenticate the request to check-in on behalf of the device 106. The device connector service 121 can store a management token for the device 106, such as an HMAC token. The device connector service 121 can use the management token for the device 106 to authenticate the endpoint management service check-in. The endpoint management service check-in can include the management UDID 142 and the management token as parameters.

In step 342, any commands and other configurations 148 from the endpoint management service 120 can be provided to the device connector client 161. The device connector client 161 can transmit and apply the configurations 148 to the device 106.

Figure 4:
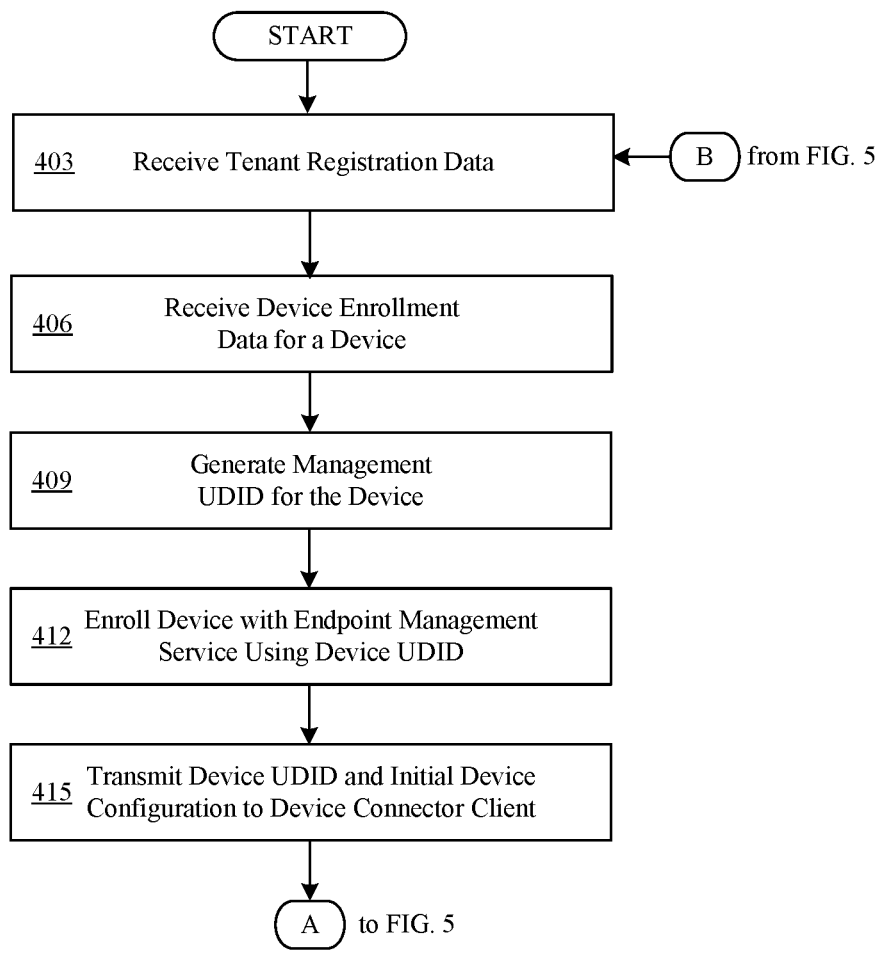
FIG. 4 is a flowchart depicting an example of functionalities performed by components of the network environment for device and management service integration, according to the present disclosure.

FIG. 4 is a flowchart depicting functionalities performed by components of the networked environment 100 for integration of the device 106 and the endpoint management service 120 using the device connector service 121. While the flowchart is discussed as generally performed by the device connector service 121, some elements are also implemented by other components of the networked environment 100.

In step 403, the device connector service 121 can receive tenant registration data 139. The device connector service 121 can include a connector tenant registration API that can be invoked to enable an enterprise tenant of the endpoint management service 120 to use the device connector service 121. The tenant registration data 139 that is received through the connector tenant registration API can include a tenant identifier or root enterprise identifier of the tenant with the endpoint management service 120. The tenant registration data 139 can include a tenant identifier, a tenant secret, administrator credentials or API credentials, an API token for API communications, and a URL of the endpoint management service 120 for API and other communications.

In step 406, the device connector service 121 can receive device enrollment data. The device enrollment data can include a tenant email domain, and a tenant group 146 identifier. The device enrollment data can also include a device identifier 166 of the device 106, such as a serial number. The device connector service 121 can receive device enrollment data from a device connector client 161 executed on an edge device 108, or a third-party management service 122.

Generally, the device 106 can initially connect to a DHCP server or another edge device 108, which provides the URL for a device connector client 161 that operates as an extension of the device connector service 121, as well as a group 146 identifier and a tenant email domain. The device 106 can then add its device identifier 166 to this information and transmit the device enrollment data to the URL for the device connector client 161. The device connector client 161 can securely forward this device enrollment data to the device connector service 121. For example, the device connector client 161 can authenticate the forwarded transmission of device enrollment data using authentication information including certificates for certificate mutual authentication, an API token, and authentication credentials.

In step 409, the device connector service 121 can generate a management UDID 142 for the device 106. The device connector service 121 can take inputs including the device identifier 166, tenant email domain, a client identifier, and potentially other parameters to generate the management UDID 142. The client identifier can include a tenant identifier of the tenant, an identifier of a third-party management service 122, or an identifier of the instance of the device connector client 161 service that is communicating with the device 106. In some examples, the device connector service 121 can generate the management UDID 142 by inputting the device identifier 166, the tenant email domain, and the client identifier into a UDID generation algorithm when a connector enroll API is called. The UDID generation algorithm can include a hash function-based algorithm or another type of algorithm. This can create a globally unique management UDID 142 across all tenants, all device connector clients 161, and devices 106.

In step 412, the device connector service 121 can enroll the device 106 with the endpoint management service 120 using the globally unique management UDID 142. Generally, the device connector service 121 can use the tenant registration data 139, the device enrollment data, and the management UDID 142 to enroll the device 106. This can include transmitting multiple requests, such as invoking multiple APIs of the endpoint management service 120. The requests can include the device enrollment data and the management UDID 142. The requests can be routed through the endpoint management service 120 URL provided in the tenant registration data 139, and can be authenticated using the credentials and other authentication data provided in the tenant registration data 139.

In step 415, the device connector service 121 can transmit the management UDID 142 and the device configuration 148 to the device connector client 161. The device connector client 161 can store the management token in the edge device 108 or a data store of the third-party management service 122. The device connector client 161 can transmit the device configuration 148 to the device 106. For example, the device connector client 161 can invoke a function of the device 106 to apply the device configuration 148 to the device 106. The process can move to connector A which connects to FIG. 5 for examples of functionality for enrolled devices 106.

Figure 5:
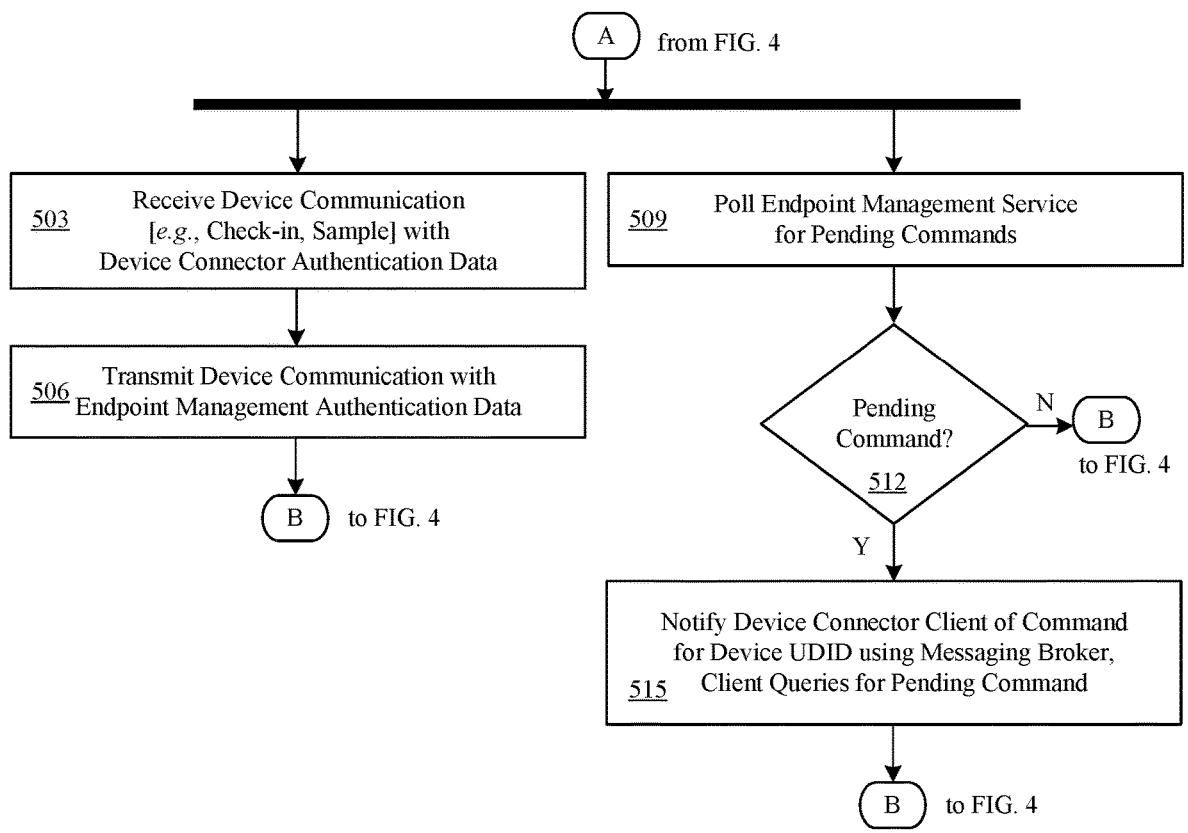
FIG. 5 is a flowchart depicting another example of functionalities performed by components of the network environment for device and management service integration, according to the present disclosure.

FIG. 5 is another flowchart depicting functionalities performed by components of the networked environment 100 for integration of the device 106 and the endpoint management service 120 using the device connector service 121. While the flowchart is discussed as generally performed by the device connector service 121, some elements are also implemented by other components of the networked environment 100.

In step 503, the device connector service 121 can receive a device communication relayed by the device connector client 161 from the client device 106. The device connector client 161 can receive the device communication such as a device data 150 sample, or a check-in beacon from a device 106. The device connector client 161 can identify and invoke a corresponding API of the device connector service 121. The device communication can include the device data 150 sample or a check-in beacon command, and can identify the originating device 106 using the management UDID 142. The device connector client 161 can forward the device communication along with device connector authentication data, such as an API token for the connector APIs. The device connector service 121 can authenticate the device communication using the API token and certificate mutual authentication, such as a certificate exchange between the device connector service 121 and the device connector client 161.

In step 506, the device connector service 121 can transmit the device communication to the endpoint management service 120 with the endpoint management authentication data. The device connector service 121 can authenticate communications with the endpoint management service 120 on behalf of the device 106. This enables the device connector service 121 to relay a device data 150 sample, or a check-in beacon to the endpoint management service 120 along with appropriate authentication requirements. The device connector service 121 can forward the device communications along with endpoint management service authentication data, such as a management token for the endpoint management service APIs. The process can then move to connector B, which connects to FIG. 4.

In step 509, the device connector service 121 can poll the endpoint management service 120 to get notified of any pending commands for any devices 106 it manages. This can include invoking an endpoint management service API or otherwise querying the endpoint management service 120 to identify available commands for one or more device 106 that are integrated using the device connector service 121. This can include individual polling for individual devices 106, batch requests for multiple devices, or a subscription publication-based mechanism that notifies the device connector service 121 of available commands for the devices 106 it integrates or 'manages.'

In step 512, the device connector service 121 can determine whether a pending command is identified. If the device connector service 121 identifies a pending command for a device 106, the process can move to step 515. Otherwise, the process can move to connector B, which connects to FIG. 4.

In step 515, the device connector service 121 can notify the device connector client 161 that is associated with that device 106 and its management UDID 142. The device connector service 121 can identify the device 106 that has a pending command and look up the device connector client 161 associated with its management UDID 142. The device connector service 121 can include the management UDID 142 in the notification to the device connector client 161. The notification process can include publishing to the message broker such as an MQTT broker, which can be a message broker component 137 of the device connector service 121.

The device connector client 161 can have a messaging subscription with the message broker component 137 to pick up the notification. The notification can contain the management UDID 142 in the message. The device connector client 161 can query the device connector service 121 for the actual command payload. The device connector service 121 can relay the command retrieval request to the endpoint management service 120.

The endpoint management service 120 can provide a command from the device 106 command queue to the device connector client 161, which relays the command back to the device 106. In other examples, the endpoint management service 120 can return the command to the device connector service 121, which can transmit the command to the device connector client 161, which provides the commands to the device 106. The process can move to connector B, which connects to FIG. 4.

Stored in the memory device are both data and several components that are executable by the processor. In particular, stored in the one or more memory devices and executable by the device processor can be applications and other executable instructions. Also, stored in the memory can be a data store and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as, object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The devices 106 can include a display upon which a user interface can be rendered. In some examples, the user interface can be generated using user interface data provided by the management computing environment 103 and the computing environment 112. The device 106 can also include one or more input/output devices that can include, for example, a capacitive touchscreen or other type of touch input device, fingerprint reader, or keyboard.

Although the endpoint management services 120, the device connector service 121, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram(s) and/or flowchart(s) shows examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
    at least one computing device comprising at least one processor; and
    at least one memory comprising machine-readable instructions, wherein the instructions, when executed by the at least one processor, cause the at least one computing device to at least:
        receive, by a device connector service, a device communication that is relayed from a device to the device connector service by a device connector client, the device communication comprising: device connector authentication data, and a device identifier for the device;
        modify, by the device connector service, the device communication into a modified device communication comprising: management service authentication data, and a management unique device identifier (UDID) that is different from the device identifier;
        transmit, by the device connector service, the modified device communication to a management service;
        receive, from the management service, a command notification indicating that at least one command is pending for the device, wherein the command notification is received based at least in part on at least one of a polling mechanism; and
        transmit, to the device connector client, an indication that the at least one command is pending for the device, wherein the device connector client comprises a messaging broker subscription associated with the device connector service.

2. The system of claim 1, wherein the device communication comprises a device check-in request for the device, or a device data sample from the device.

3. The system of claim 1, wherein the device identifier comprises: a manufacturer-assigned device identifier, an enterprise-assigned device identifier, or a serial number.

4. The system of claim 1, wherein the management UDID is an identifier generated by the device connector service based at least in part on a device identifier for the device and an enterprise identifier for an enterprise.

5. The system of claim 1, wherein the device connector service maintains a data structure that maps device identifiers to management UDIDs for a plurality of devices that the device connector service integrates with the management service.

6. The system of claim 1, wherein the command notification is received based at least in part the polling mechanism.

7. The system of claim 1, wherein the device connector client is executed by an edge device or a third-party management service that is separate from the management service.

8. A non-transitory computer-readable medium comprising machine-readable instructions, wherein the instructions, when executed by at least one processor, cause at least one computing device to at least:
    receive, by a device connector service, a device communication that is relayed from a device to the device connector service by a device connector client, the device communication comprising: device connector authentication data, and a device identifier for the device;
    modify, by the device connector service, the device communication into a modified device communication comprising: management service authentication data, and a management unique device identifier (UDID) that is different from the device identifier;
    transmit, by the device connector service, the modified device communication to a management service;
    receive, from the management service, a command notification indicating that at least one command is pending for the device; and
    transmit, to the device connector client, an indication that the at least one command is pending for the device, wherein the device connector client comprises a messaging broker subscription associated with the device connector service.

9. The non-transitory computer-readable medium of claim 8, wherein the device communication comprises a device check-in request for the device, or a device data sample from the device.

10. The non-transitory computer-readable medium of claim 8, wherein the device identifier comprises: a manufacturer-assigned device identifier, an enterprise-assigned device identifier, or a serial number.

11. The non-transitory computer-readable medium of claim 8, wherein the management UDID is an identifier generated by the device connector service based at least in part on a device identifier for the device and an enterprise identifier for an enterprise.

12. The non-transitory computer-readable medium of claim 8, wherein the device connector service maintains a data structure that maps device identifiers to management UDIDs for a plurality of devices that the device connector service integrates with the management service.

13. The non-transitory computer-readable medium of claim 8, wherein the command notification is received based at least in part on at least one of a polling mechanism, or a publish-subscribe mechanism.

14. The non-transitory computer-readable medium of claim 8, wherein the device connector client is executed by an edge device or a third-party management service that is separate from the management service.

15. A method performed by instructions executed by at least one processor of at least one computing device, the method comprising:
- receiving, by a device connector service, a device communication that is relayed from a device to the device connector service by a device connector client, the device communication comprising: device connector authentication data, and a device identifier for the device;
- modifying, by the device connector service, the device communication into a modified device communication comprising: management service authentication data, and a management unique device identifier (UDID) that is different from the device identifier; and
- transmitting, by the device connector service, the modified device communication to a management service;
- receiving, from the management service, a command notification indicating that at least one command is pending for the device; and
- transmitting, to the device connector client, an indication that the at least one command is pending for the device, wherein the device connector client comprises a messaging broker subscription associated with the device connector service.

16. The method of claim 15, wherein the device communication comprises a device check-in request for the device, or a device data sample from the device.

17. The method of claim 15, wherein the device identifier comprises: a manufacturer-assigned device identifier, an enterprise-assigned device identifier, or a serial number.

18. The method of claim 15, wherein the management UDID is an identifier generated by the device connector service based at least in part on a device identifier for the device and an enterprise identifier for an enterprise.

19. The method of claim 15, wherein the device connector service maintains a data structure that maps device identifiers to management UDIDs for a plurality of devices that the device connector service integrates with the management service.

20. The method of claim 15, wherein the command notification is received based at least in part on at least one of a polling mechanism, or a publish-subscribe mechanism.

* * * * *